(12) United States Patent
Voroshilov et al.

(10) Patent No.: US 11,544,818 B2
(45) Date of Patent: Jan. 3, 2023

(54) ENHANCING HIGH-RESOLUTION IMAGES WITH DATA FROM LOW-RESOLUTION IMAGES

(71) Applicant: Nvidia Corporation, Santa Clara, CA (US)

(72) Inventors: Andrey Voroshilov, Santa Clara, CA (US); Halldor Fannar, Santa Clara, CA (US); Dmitry Duka, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/228,918

(22) Filed: Apr. 13, 2021

(65) Prior Publication Data

US 2021/0233211 A1    Jul. 29, 2021

Related U.S. Application Data

(63) Continuation of application No. 16/289,452, filed on Feb. 28, 2019, now Pat. No. 11,004,178.
(Continued)

(51) Int. Cl.
*G06T 3/40* (2006.01)
*G06T 5/50* (2006.01)
*G06T 5/10* (2006.01)

(52) U.S. Cl.
CPC .......... *G06T 3/4076* (2013.01); *G06T 3/4007* (2013.01); *G06T 3/4053* (2013.01);
(Continued)

(58) Field of Classification Search
CPC ... G06T 3/4076; G06T 3/4007; G06T 3/4053; G06T 5/10; G06T 5/15; G06T 2207/20021; G06T 2207/20056
See application file for complete search history.

(56) References Cited

U.S. PATENT DOCUMENTS

| 5,191,416 A | 3/1993 | Dickson et al. |
| 7,362,900 B2 | 4/2008 | Urano et al. |
| (Continued) | | |

FOREIGN PATENT DOCUMENTS

| CN | 102156875 B | 4/2013 |
| CN | 103093445 A | 5/2013 |
| (Continued) | | |

OTHER PUBLICATIONS

Glasner, Daniel, Shai Bagon, and Michal Irani. "Super-resolution from a single image." In 2009 IEEE 12th international conference on computer vision, pp. 349-356. IEEE, 2009.*
(Continued)

*Primary Examiner* — Sarah Lhymn

(57) ABSTRACT

Users often desire to capture certain images from an application. Existing methods of capturing images can result in low-resolution images due to limitations of the display device providing the images. This disclosure provides a method of capturing higher resolution images from source images. Techniques are also disclosed to reduce the storage size associated with the higher resolution images. Through capturing low-resolution versions of the same source images, image effects can be captured and applied to the higher resolution images where those image effects may be altered or missing. Frequency spectrum combination can be used to combine the low-resolution image data and the higher resolution image data. The higher resolution images can be processed using a segmentation scheme, such as tiling, without reducing or limiting the image effects.

18 Claims, 7 Drawing Sheets

Related U.S. Application Data

(60) Provisional application No. 62/637,212, filed on Mar. 1, 2018.

(52) U.S. Cl.
CPC ................ G06T 5/10 (2013.01); G06T 5/50 (2013.01); *G06T 2207/20021* (2013.01); *G06T 2207/20056* (2013.01)

(56) References Cited

U.S. PATENT DOCUMENTS

| | | | |
|---|---|---|---|
| 8,275,217 B2 | 9/2012 | Drabycz et al. | |
| 8,620,073 B2 | 12/2013 | Tuzel et al. | |
| 8,655,109 B2 | 2/2014 | Lin et al. | |
| 8,743,963 B2 | 6/2014 | Kanumuri et al. | |
| 8,755,636 B2 | 6/2014 | Zhang et al. | |
| 8,989,519 B2 | 3/2015 | Irani et al. | |
| 9,066,025 B2 | 6/2015 | Tao et al. | |
| 9,118,872 B1 | 8/2015 | Goodman et al. | |
| 9,183,582 B2 | 11/2015 | Beaver, III et al. | |
| 9,384,533 B2 | 7/2016 | Shin et al. | |
| 9,497,243 B1* | 11/2016 | Binns | H04N 21/2387 |
| 9,600,861 B2 | 3/2017 | Liang et al. | |
| 9,652,830 B2 | 5/2017 | Turkan et al. | |
| 9,734,558 B2 | 8/2017 | Porikli et al. | |
| 9,900,475 B2 | 2/2018 | Chen | |
| 10,049,432 B2 | 8/2018 | Kurihara et al. | |
| 2004/0239885 A1 | 12/2004 | Jaynes et al. | |
| 2011/0026849 A1 | 2/2011 | Kameyama | |
| 2013/0279805 A1* | 10/2013 | Zillman | G06T 3/4084 382/170 |
| 2013/0279826 A1 | 10/2013 | Chuang et al. | |
| 2014/0307079 A1 | 10/2014 | Aragaki | |
| 2014/0354886 A1 | 12/2014 | Michaeli et al. | |
| 2015/0023611 A1 | 1/2015 | Salvador et al. | |
| 2015/0093015 A1 | 4/2015 | Liang et al. | |
| 2015/0172726 A1 | 6/2015 | Faramarzi et al. | |
| 2016/0180803 A1 | 6/2016 | Hui et al. | |
| 2017/0006284 A1 | 1/2017 | Gokhale et al. | |
| 2017/0178317 A1* | 6/2017 | Besley | G06T 7/0012 |
| 2017/0220000 A1 | 8/2017 | Ozcan et al. | |
| 2017/0363853 A1 | 12/2017 | Besley | |
| 2018/0005361 A1 | 1/2018 | Bulyshev | |
| 2018/0232947 A1* | 8/2018 | Nehmadi | G01S 7/295 |

FOREIGN PATENT DOCUMENTS

| | | | |
|---|---|---|---|
| CN | 103295197 A | 9/2013 | |
| CN | 103780863 A | 5/2014 | |
| CN | 105427249 A | 3/2016 | |
| CN | 103617597 B | 5/2016 | |
| CN | 105118025 B | 3/2018 | |
| CN | 107967669 A | 4/2018 | |
| KR | 101348931 B1 | 1/2014 | |
| WO | WO-2006052390 A2 * | 5/2006 | G06F 16/9577 |
| WO | 2017191643 A1 | 11/2017 | |

OTHER PUBLICATIONS

Freeman, W. T., Jones, T. R., & Pasztor, E. C. (2002). Example-based super-resolution. IEEE Computer graphics and Applications, 22(2), 56-65.*

"Tile-based image processing"; Ghostwriter example; https://computer-vision-talks.com/tile-based-image-processing/; 2015; 4 pgs.

* cited by examiner

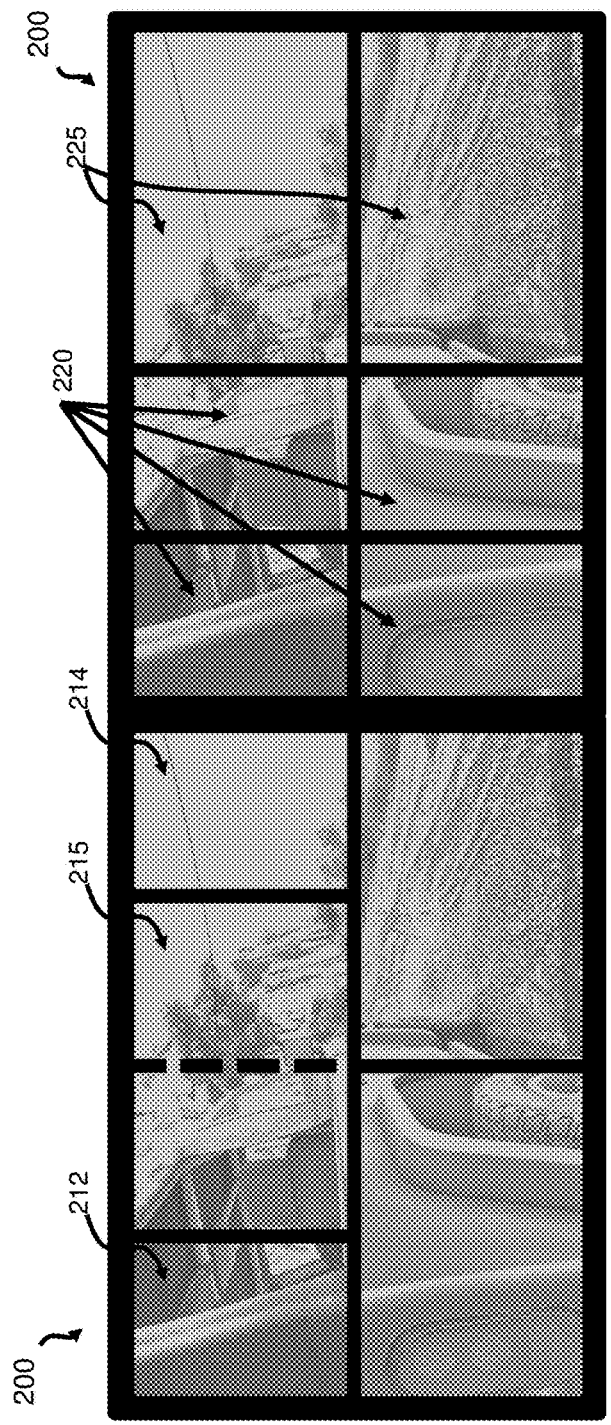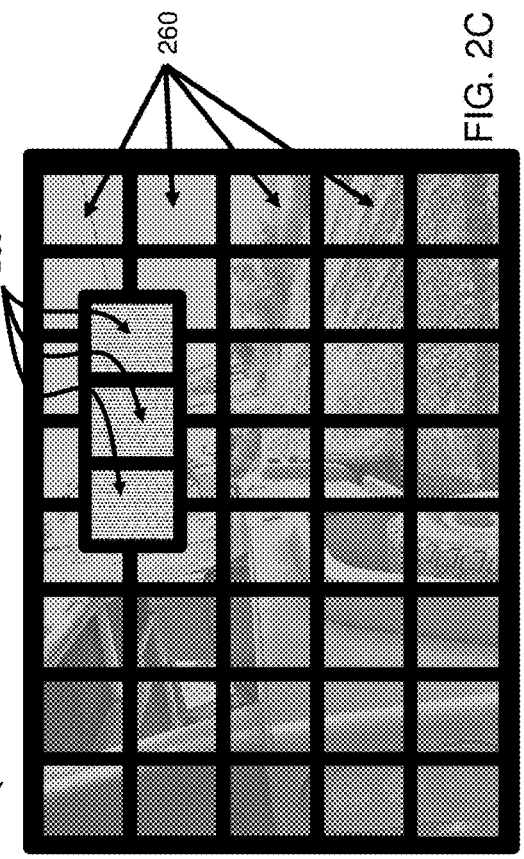

ENHANCING HIGH-RESOLUTION IMAGES WITH DATA FROM LOW-RESOLUTION IMAGES

CROSS-REFERENCE TO RELATED APPLICATION

This application is a continuation application of U.S. patent application Ser. No. 16/289,452, filed by Andrey Voroshilov, et al. on Feb. 28, 2019, entitled "ENHANCING HIGH-RESOLUTION IMAGES WITH DATA FROM LOW-RESOLUTION IMAGES," which claims the benefit of U.S. Provisional Application Ser. No. 62/637,212, filed by Andrey Voroshilov, et al. on Mar. 1, 2018, entitled "HIGH RESOLUTION IMAGE CAPTURE USING SPECTRUM RECOMBINATION ACROSS TILES." All of the above listed applications are commonly assigned with this application and incorporated herein by reference.

TECHNICAL FIELD

This application is directed, in general, to high resolution image capture and, more specifically, to using low resolution image data to supplement high resolution image data.

BACKGROUND

A user may wish to capture an image, or screenshot, of what is displayed in a particular scene. This can be from an application, such as a game application. Existing methods of accomplishing this task can be using the keyboard shortcuts [ctrl-PrintScreen] or [alt-PrintScreen] keyboard command, or using a screen capture utility.

For simple and low-resolution image captures, the existing methods can achieve satisfactory results. The existing solutions generally capture the designated screen image. As the image resolution increases, the size of the stored file also increases. As the image resolution increases, other image capture techniques can be used, such as various tiling approaches and hotsampling. Tiling can be used with a sub-pixel offset capture. This technique does not produce high quality images since the hardware texture level of detail (LOD) can blur textures and some texture details may be missing. In addition, this method may not be compatible with anti-aliasing. Hotsampling can be limited by the hardware capabilities and can also result in undersampling issues in some effects that assume a specific display size, such as calculations for a step size and number of steps. A more efficient high-resolution image capture system would be beneficial.

SUMMARY

In one aspect, a high-resolution image capture system is described. One embodiment of the system includes: (1) an image storage device to store images, image data, and tiles of the images, wherein the images are one or more of a source image, a first image, a second image, and a final image, and wherein the tiles are one or more of intermediate tiles, corresponding tiles, and final tiles of the final image, and (2) an image processor to generate the first image and the second image from the source image and to generate final tiles of the final image by processing the first image and the second image, wherein the first image is a higher resolution than the second image, and the processing includes: (a) determining the intermediate tiles from the first image and the corresponding tiles from the second image; (b) determining frequency spectrum data sets for each of the intermediate tiles and the corresponding tiles; (c) interpolating the frequency spectrum data sets from each of the intermediate tiles and the respective corresponding tiles; and (d) converting the interpolated frequency spectrum data sets to the final tiles.

In another aspect, a cloud-based image processing system is described. One embodiment of the system includes: (1) an image storage, operable to store image data, intermediate tiles, corresponding tiles, and final tiles an image storage to store image data, intermediate tiles of a first image, corresponding tiles of a second image, and final tiles of a final image, and (2) an image processor communicatively coupled to the image storage and to generate, the final tiles utilizing the image data, the first image, and the second image, wherein the first image and the second image are derived from the image data, and the first image is at a higher resolution than the second image, and wherein the utilizing includes: (a) determining the intermediate tiles from the first image and the corresponding tiles from the second image; (b) determining frequency spectrum data sets for each of the intermediate tiles and the corresponding tiles; (c) interpolating the frequency spectrum data sets from each of the intermediate tiles and the respective corresponding tiles; and (d) converting the interpolated frequency spectrum data sets to the final tiles

BRIEF DESCRIPTION

Reference is now made to the following descriptions taken in conjunction with the accompanying drawings, in which:

FIG. 2A is an illustration of a diagram demonstrating an example overlap tiling pattern for an image;

FIG. 2B is an illustration of a diagram demonstrating an example multi-sized tiling pattern for an image;

FIG. 2C is an illustration of a diagram demonstrating an example corner overlap tiling pattern for an image;

DETAILED DESCRIPTION

Figure 1:
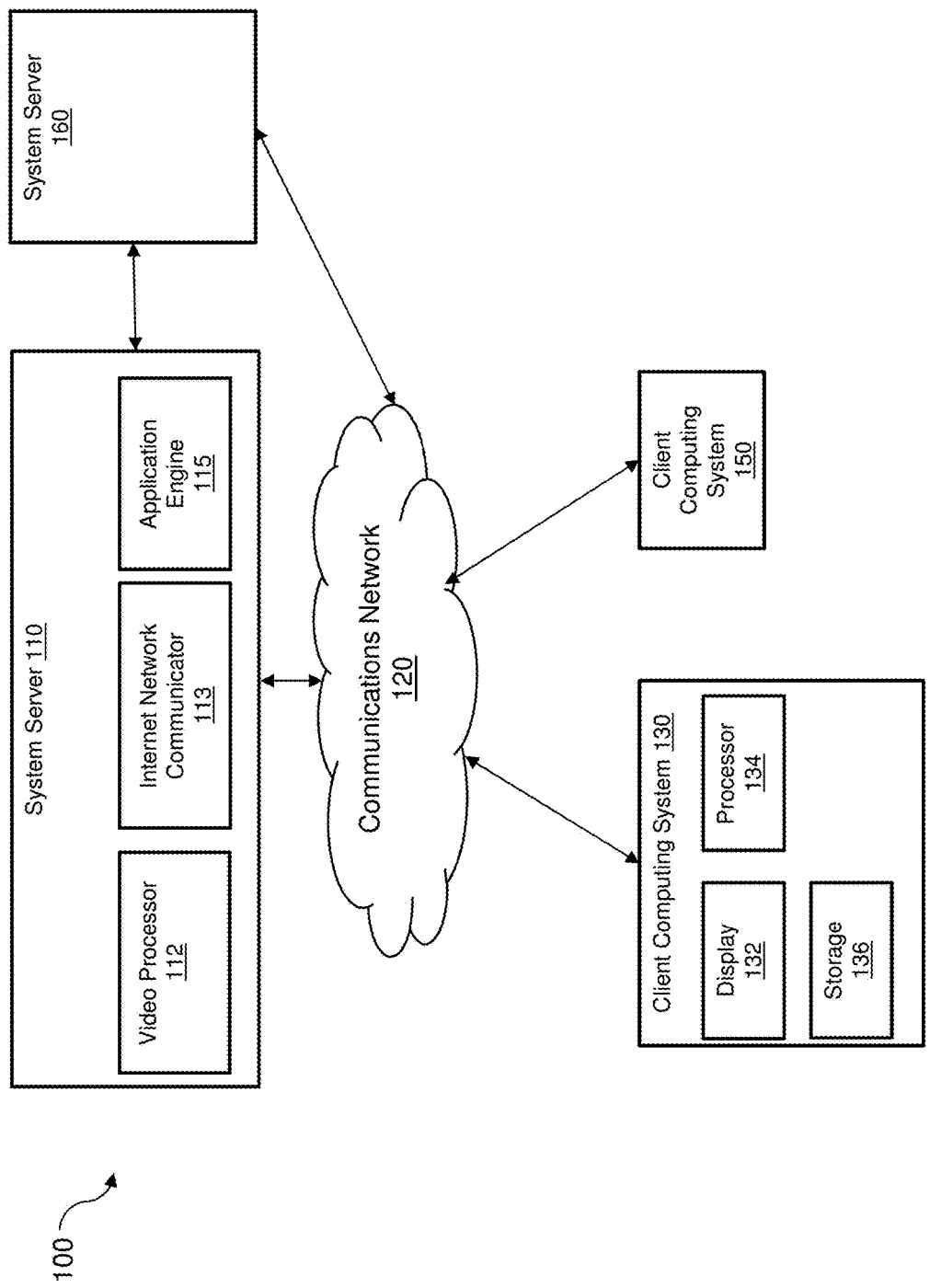
FIG. 1 is an illustration of a block diagram of an example system for capturing high resolution images.

Computers can generate truly spectacular images, and there are times when a user wants to capture a picture—a moment of triumph in a videogame, or a fantastic scene of an alien landscape, for example. Historically, there were limitations on such pictures—the user could not capture a screenshot that had a higher resolution than their monitor supported (e.g., the number of pixels the monitor has, often described with terms such as "1080p" or "4k"). This, in turn, meant that the user was limited in what they could do with such a picture—a 1080p screenshot, displayed on a 24" monitor, looks much better than the same image at the same resolution printed as a giant wall poster. Technologies such as Ansel™ by NVIDIA Corporation have started to address these limitations by allowing the user to generate (or "render") a picture at a much higher resolution than the monitor supports, or even larger than the user's graphics processing unit (GPU) can handle as a single picture. Such pictures are sometimes referred to as "super-resolution" images.

One technique for creating such high- or super-resolution pictures is to divide the work that needs to be done into parts, sometimes called "tiles". Using tiles lets the user's GPU spread the work out across more steps, breaking it into smaller parts that can be handled individually. Each tile is treated like a separate picture, processed separately, and then all of the tiles that make up the full picture can be reassembled into the complete super-resolution picture. This process is convenient and allows for much larger super-resolution images than a GPU could otherwise handle, but it can also introduce some new problems—visible errors in the picture. (These errors are sometimes referred to as "artifacts.") For example, one such error occurs when a light source, like a headlight, appears in one tile but not another—for the super-resolution picture to look correct, the light from the headlight needs to be handled correctly, so that it shines across the borders of tiles in a realistic fashion. With the tiled approach to rendering super-resolution images, this does not always happen correctly.

For improved super-resolution images, the disclosure provides a technique that uses information from the full picture of an image to reduce the visible errors in the super-resolution images that are rendered using the tiled approach. The full picture of the image is captured at a lower resolution, such as from a screenshot of a display, to provide a low-resolution image of a scene. The low-resolution image of the scene is then divided into tiles just like described above with the super-resolution image of a scene. The lower-resolution tiles, however, do not include as much information as the tiles created from the super-resolution image of the scene. This allows all of the lower-resolution tiles to be processed as a single picture and allows capturing of information from the low-resolution image of the scene in the lower-resolution tiles. For example, capturing the above noted light from the headlight as it shines across the borders of the tiles.

The full picture can then be captured at super-resolution to provide a super-resolution image of the scene and divided into tiles like the lower-resolution tiles. The super-resolution tiles are then processed as separate pictures. This time information from corresponding lower-resolution tiles is used when processing the super-resolution tiles to allow information captured from the low-resolution image of the scene to be included. The super-resolution tiles can then be combined to provide a full picture at a super resolution with reduced errors. In other words, a super-resolution image of the scene that shows the light from the headlight realistically shining across the scene.

A super-resolution image is an example of a higher resolution image wherein the image generated from the application can be a much higher resolution than is capable to be displayed by the display device. An example super-resolution image can be an image generated, i.e., rendered, by an application at 8192 pixels by 6144 pixels, where that image can be transformed for a monitor displaying 2048 pixels by 1536 pixels. The super resolution image can be generated despite the display device's capabilities.

One of the issues with generating higher resolution images, such as super resolution images, is the amount of storage space that is required to store the image data. For example, the 8192 by 6144-pixel image described above can take over 50 megabytes of data to store the image. Various techniques that are available to reduce the storage size or to segment the image into smaller, more manageable chunks of image data can lead to a loss of quality as compared to the original high-resolution image. As mentioned above, if only one portion of the generated image is processed and saved as a chunk of the captured image, some image details may be lost or altered, such as a light source in a portion not currently being processed. The processing that generates the portion of the captured image may not take into account the light source that is affecting the current chunk of the generated image. Shadows, brightness, reflections, and other image considerations can be affected.

The technique demonstrated by this disclosure segments the source image to allow a computing system to handle and manipulate the image more efficiently. A low-resolution version of the source image can be employed that captures some image effects that could be lost or reduced when segmenting the source image. The low-resolution image effects can later be combined with the source image to restore the reduced or missing effects, thereby improving the overall visual quality of the captured image. The combined image data from the source image and the low-resolution version of the source image can be utilized to generate the high-resolution image.

For example, a user can identify an image to generate, e.g., from a source image, and specify image parameters, such as a target image resolution for the generated high-resolution image. The source image can be divided into grid like sections, i.e., a tiling pattern. Some of the grid like sections can overlap a little or a lot. Also, the grid like sections can be of various sizes, and even various shapes. The overlapping, size, and shape adjustments can help the final image be as sharp as it can be, e.g., minimize any image problems, issues, or artifacts.

A low-resolution version of the source image can then be generated. The same tiling pattern (grid like sections) can be applied to the low-resolution image. Since the low-resolution image takes up much less storage space than the target image resolution, the entire low-resolution image can be manipulated by the computing system as one large section. The process further described below can analyze the low-resolution image and determine various image elements, such as lighting, shadows, reflections, and other image element characteristics. The portion of each of these image characteristics corresponding to each tile in the tiling pattern can be stored in that low-resolution tile. The image element characteristics can be stored as frequency spectrum data in each low-resolution tile.

Since the amount of data potentially used by a generated high-resolution version of the image can be very large, each tile of the source image should be processed separately. As each tile of the source image is processed, the image element characteristics, i.e., the frequency spectrum data, previously identified in the low-resolution version of the image can be applied or combined with the frequency spectrum data of the source image tile. This can have the effect of maintaining image characteristics that apply to the whole image by applying a portion of those image characteristics to each of the source tiles. The tiles of the source image can then be stored or combined to generate the final high-resolution image for the user.

The image requested to be captured by a user may be displayed on display equipment, such as a computer monitor or television. For example, a user playing a game on a computer can select to capture an image that is being displayed. The image being captured can be shown on a user display in its actual size or at a smaller resolution size, such as a thumbnail. The process can take the image displayed or the process can request the application provide a higher resolution version of the image data that is displayed. This can occur if the application can generate image resolutions higher than the user's display equipment can handle. The image to be captured can also be directly generated from an application. The application can be a game program or another type of program capable of displaying images or an image from a video. In another aspect, additional image manipulation can be added to an image, such as an image effect. Examples of image effects are black and white, oil painting, watercolor, stained glass, hue, brightness, and vignette.

Capturing is acquiring an image that has been generated for a target display or a particular resolution, such as capturing an image displayed on a monitor. Generating is acquiring an image that has not yet been generated for a target display or for a particular resolution, i.e., the generated image resolution can be selected by the application or user. Capturing or generating the image can be completed in several ways. Many of the ways, such as using a keyboard shortcut, such as [ctrl-PrintScreen], can result in an image of a certain quality level; which may not be at a high enough quality level requested by the user or at a high enough quality level compared to what the application is capable of generating. Some existing techniques may enable higher resolution images to be captured at a cost of size, meaning the amount of space taken on a storage device to store the image. Generally, keeping other factors constant, as resolutions increase the amount of storage space needed to store the image also increase. If existing tile-based approaches are applied to an image generation, the resulting generated image can introduce visual artifacts, such as reduced bloom, screen space ambient occlusion (SSAO), blur, reduced reflections, and other image artifact types.

There are methods that can generate a high-resolution image, such as using a sub-pixel offset high resolution generation technique. This is a method that uses a mechanism where the image is reduced to a series of sub-images and the camera is shifted to a sub-pixel value so the camera is centered on each sub-image. This method can result in blurs, in textures not being applied uniformly, in lighting blooms should a bright pixel emerge in one of the shifts, and can be incompatible with anti-aliasing techniques. In addition, the sub-pixel method can have a limitation based on hardware snapping, i.e. a cap on the maximum resolution that can be processed.

Hotsampling can also be used to generate images. This method can be limited by the hardware capabilities, i.e. a maximum surface and image size supported, and can suffer from undersampling, such as when assumptions are made on certain parameters of a display, i.e. step sizes and the number of steps. In addition, existing techniques can cause a blurring of textures, and high-resolution images may not properly apply the texture details.

This disclosure demonstrates a technique for generating high-resolution images that can scale to a very high-resolution, such as 61,440×34,560 pixels (61K) format, while maintaining visual effects and minimizing visual artifacts in the resulting image. The very high-resolution (super-resolution) can be higher than 61K and the scaling is unlimited with sufficient system resources available. For example, a technique provided in this disclosure has produced an image of 172,800×97,200 pixels. The file size of the captured image can be manageable by user systems and by other systems with which the user can send or share the captured image.

In one aspect, a user can be playing a game on a client system, where the game can be executing locally on the client system, or the client system can include a communication connection to a server or cloud service that is executing the game on behalf of or in conjunction with the client system. The game can have certain software features included to allow the generation of a high-resolution image. For example, the NVIDIA Ansel software development kit, integrated into an application, can generate in-application images and allow users to share the image. Ansel, from NVIDIA Corporation of Santa Clara, Calif., can assist a user to compose screenshots from various positions, adjust the image with post-process filters, capture or generate high dynamic range (HDR) images in high-fidelity formats, and share them in 360 degrees using a mobile phone, computer, virtual reality headset, and other computing devices.

The application generating the source image can be executing on a local user computer system, i.e., a user device, or an internet or cloud service, wherein the user device is communicatively coupled to the internet or cloud service. The cloud service can be, for example, the NVIDIA Grid system provided by the NVIDIA Corporation. In addition, the image generation process can execute on the user device, the internet service, or the cloud service. For example, the cloud service can include one or more graphics processing units (GPUs) to enable the image generation process. The images generated within the application can be sent to the image processing system, along with other image data, such as a visual quality parameter and a target resolution, where the image processing system is located on the user device, the internet service, or cloud service. The communication between the user device and the internet or cloud service can utilize a conventional communication system, for example, a wired or wireless system communicating over a general network or internet connection, or communicating over a dedicated or private network or internet connection. In addition, the image generation process can execute wholly or partially in the user device, a server, a data center, an internet service, or a cloud service where the remaining processing can be completed in another device or service. The final rendered image can be sent to the user device, a server, a data center storage service, an internet storage service, or a cloud storage service.

The application, which has been enabled to generate high-resolution images, can have a location designated as a frame buffer. This buffer area can be used to store the image data that can be output, such as to a display. In one aspect, the described process can inform the application engine to use a specific set of camera parameters, such as a higher resolution than is physically available on the user's computer system. The process can, after the high-resolution image data is generated, intercept the frame buffer and redirect the image data output to an image storage location. In another aspect, the process can overwrite the frame buffer image data after completing the image generation process, for example, to hide the intermediate generation process from the user.

The frame buffer can be located locally, for example, on the computer system's memory, GPU memory, and hard disk, or can be located remotely, such as in a server, a cloud, internet, or data center area. The frame buffer can store image data that can be scaled to a resolution larger than the user's display equipment is capable of displaying. For example, the frame buffer can store image data that can scale to a 7680×4320 resolution (8K) while the user's display equipment can have a maximum 4k resolution. A user's display equipment can comprise of more than one display device. The collection of display devices, e.g., monitors, projectors, and other visual devices, is referred to herein as the display equipment.

The user, utilizing an included image generation software, can compose the image, apply image filters and effects, and then generate a final image that can be shared, such as on a social media platform. For example, the final image can have a significantly higher resolution than what a user typically sees on a display during use of the application or during gameplay. The higher resolution allows a user to, for example, zoom in to see details and create large form posters.

In one aspect, to create the high-resolution final image for the user, the system can first determine how to divide the source image, i.e. the image data stored in the frame buffer, into one or more tiles. The one tile option is a special case, e.g., a one-shot recombination, rather than determining multiple intermediate tiles. Tile size can usually be assigned as the size of the frame buffer, which itself is typically sized to the resolution of the user's computer system display equipment. In other aspects, tile size can vary based on various parameters, such as a pixel geometry parameter, a visual quality parameter, a user selected high-resolution image parameter (target resolution), and available system resources. In an alternate aspect, the tile size can be set higher than the frame buffer size, effectively utilizing the hotsampling technique. The number of tiles logically defined for the image is typically the resolution of the high-resolution image divided evenly by the tile size, such that the high-resolution image is a multiple of the tile size. In other aspects, the high-resolution image can be a resolution that is not an even multiple of the tile size.

The number of tiles can range from one (i.e., a one-shot complete image) to as many tiles as the system resources can support, i.e., the resolution of the high-resolution image can be unlimited, subject to available resources. In an alternative aspect, different tile sizes can be selected for different portions, or regions, of the image.

In another aspect, the tile determination process can use an off-centric camera perspective. Typically, during an application execution or gameplay, the camera perspective is generally centralized on the user's display equipment, which corresponds to the same general centralized location on the image stored in the frame buffer. The camera can be adjusted to a generally centralized location of each tile as it is processed. The off-centric camera perspective can move to the corresponding tile as each tile is determined by the system process. In another aspect, a number of images can be combined to form a larger image, for example, applying a stitching algorithm to one or more tiles of one or more images.

As the tiles are being determined, they can be overlapped. In one aspect, the overlap between tiles can be 25.0% and, in another aspect, the overlap can be 50.0%. Other tile overlap percentages can be utilized to increase the efficiency of creating the tiles utilizing the pixel geometry parameter and a visual quality parameter. Larger overlap amounts will generally yield a higher image quality, i.e., a higher visual quality parameter, as inconsistencies can be corrected, while incurring a higher cost of more processing time and storage space. By overlapping the tiles, image artifacts can be reduced, and overlapping can compensate for inconsistencies between the tiles. In another aspect, blending techniques can be used on the tiles to increase the visual quality.

From the image data storage location, i.e., the frame buffer, the system can obtain a low-resolution image of the same source image. The low-resolution image can typically be the size of the frame buffer. In an alternate aspect, such as when utilizing a hotsampling approach, the resolution can vary. The low-resolution image can contain less image details than the tiled source image and maintain the image effects, such as, blur, bloom, SSAO, and screen space reflection (SSR).

Each of the tiles from the source image, called intermediate tiles as they will be modified at a later step, can be processed through a frequency spectrum algorithm. For example, a type of fast Fourier transformation (FFT) can be applied. Similarly, the full low-resolution image can be processed through a frequency spectrum algorithm. Since the low-resolution image is much smaller in size and storage space required to store the image, the full low-resolution image can be processed as one image portion. This allows the frequency spectrum data from the low-resolution image to be representative across the entire image. The tiling pattern used for the source image can be similarly applied to the low-resolution image, thereby identifying corresponding tiles of the low-resolution image to the intermediate tiles. The low-resolution image frequency spectrum data can be portioned to each respective corresponding tile.

The frequency spectrum data or set of data from the corresponding tile can be applied to the frequency spectrum data or set of data for each intermediate tile, so that the image effects can be applied to each intermediate tile. The frequency spectrum data from each intermediate tile can now be viewed in context of the effects applied to the full image. To increase the efficiency of a frequency spectrum algorithm, for one or more of the intermediate tiles, the process can utilize padding algorithms, for example, same/clamp-to-edge padding.

In another aspect, blending techniques can be used so that there can be a gradual decreasing of blending towards the edges of the low-resolution frequency spectrum. Blending can be user-controlled, i.e., the intensity of the frequency spectrum recombination can be set more or less intense via a user-controlled blending intensity parameter. The intensity can be controlled by an interpolation factor, effectively changing the interpolation shape, i.e., making the interpolation steeper as the intensity decreases. A steeper interpolation shape means that the interpolation coefficient will fall off quicker and less low-resolution spectrum will be transferred to the intermediate spectrum (see FIG. 4B). This feature can be utilized when high resolution tiles have low resolution frequency spectrum details, where those details are missing from the lower resolution image. This can occur, for example, if there is a missing reflection on water and when objects under water are not seen at all. Less intense recombination intensity can avoid ringing artifacts while providing quality improvements to the overall high-resolution image.

Once the intermediate tile frequency spectrum data set has been modified, each intermediate tile's frequency spectrum data set can be processed through a reverse, i.e. inverse, frequency spectrum algorithm, such as an inverse FFT (iFFT), to generate each high-resolution intermediate tile which now includes the low-resolution frequency effects. The tile can now be identified as a final high-resolution tile. The final high-resolution tiles can be finalized and saved to a storage location. The user can then use the final high-resolution tile set in further actions, such as being stitched together using a stitching algorithm to generate the high-resolution image.

In another aspect, the processes and methods disclosed herein can be applied to image sets where in addition to a source image and a low-resolution image, there can be one or more mid-resolution images. The images in the image set can be combined, using the methods, apparatuses, and systems disclosed herein. The image set can be a multi-scale representation, i.e., image pyramid. Multi-scale representations can utilize additional system resources while reducing image artifacts more than in a two-image set.

The single source image and low-resolution image can be considered a special case of the multi-scale image sets. For example, if there are four images in a multi-scale image set, such as a one magnification low-resolution image (1×, where the #x represents a relative resolution), two mid resolution images at 6× and 18×, and a 32× high resolution image, then these images can be combined following various algorithms. Two example algorithms are shown as option 1 and option 2.

Option 1: (1) Combine frequency spectrum of the 18× image with the lower frequencies of the 32× image resulting in image A whose resolution is 32×. (2) Combine frequency spectrum of the 6× image with the lower frequencies of image A resulting in image B whose resolution is 32×. (3) Combine frequency spectrum of the 1× image with the lower frequencies of image B resulting in the final high-resolution image whose resolution is 32×.

Option 2: (1) Combine frequency spectrum of the 1× image with the lower frequencies of the 6× image resulting in image A whose resolution is 6×. (2) Combine frequency spectrum of image A with the lower frequencies of the 18× image resulting in image B whose resolution is 18×. (3) Combine frequency spectrum of the image B with the lower frequencies of the 32× image resulting in the final high-resolution image whose resolution is 32×.

Turning now to the figures, FIG. 1 is an illustration of a block diagram of an example system 100 for generating high-resolution images. System 100 includes a client computing system 130, an optional system server 110, zero or more additional client computing systems 150, and optional additional system servers 160. The client computing systems 130 and 150 can be of various types of computing systems, for example, but not limited to, a computer, laptop, home entertainment system (i.e., xBox, PlayStation, Wii, and other types of systems), smartphone, tablet, mobile computing device, and other types of user devices. Client computing system 130 includes a processor 134 and a storage medium 136. Optionally, it can include display equipment 132 to display the image. Processor 134 can execute one or more software applications and execute the methods described herein. Processor 134 can be a GPU or a combination of multiple GPUs. Storage 136 can store the original or source image and data, in various formats, and the resulting high-resolution image and data that are generated.

Optionally, client computing system 130 can communicate with system server 110 through a communications network 120. Communications network 120 can transceive image data and other parameters with client computing system 130 and system server 110. Communications network 120 can be various types of communications, such as the internet, WI-FI, local area network, Ethernet, or other types. System server 110 can be located proximate to, or located a distance from, client computing device 130. System server 110 can be a cloud-based image processing system, a data center-based image processing system, and a server-based image processing system. System server 110 includes a video processor 112, an internet network communicator 113, and application engine 115. Video processor 112 and application engine 115 are logical functionalities and can be implemented together or separately and with other functions. Video processor 112 can include one or more GPUs arranged to process the image capture functionality. Internet network communicator 113 can be a conventional communicator capable of communicating data to and from other system servers (such as system server 160), client computing systems (such as client computing systems 130 and 150), and other computing systems. Application engine 115 can run an application that can initiate the generation of an image which can be rendered, or partially rendered by video processor 112. System server 110 can then send the image, or image data, to client computing system 130.

Optional additional client computing systems 150 demonstrate that system server 110 can provide images to multiple clients, either the same image, or using a separate instance of the application engine 115, its own respective images. Optional additional system servers 160 represent that an application can be executing on a cloud-based system, data center, server, and other computing systems, and that application can communicate image data to system server 110 and receive the final image and final image tiles from system server 110. In this situation, the client computing system 130 can be communicating with the optional additional system server 160 in the execution of the application.

FIGS. 2A, 2B, and 2C are an illustration of diagram images 200 demonstrating example tiling patterns for an image. FIG. 2A demonstrates an example of how intermediate tiles can be determined for an image creating an overlap of tiles. Image 200 is divided into four intermediate tiles. In this example there is a fifth intermediate tile 215 that is overlapping tiles 212 and 214, by about 50.0% overlap. For this example, additional overlapping tiles (not shown) can be determined as well.

FIG. 2B demonstrates an example using image 200 shown with different sized, i.e., multi-sized, intermediate tiles across different regions of the image 200. For this example, tiles 220 designate a smaller area than tile 225. This can be due to the pixel geometry parameter and other factors that can influence an optimum tile size.

FIG. 2C demonstrates an example using image 200 shown with multiple small sized intermediate tiles 260, where a corner overlap pattern is used. Overlapping the small sized tiles 260 are similar sized tiles 265. In this example, they are shown overlapping neighboring tiles by about 25.0%. Overlapping percentages can be determined to be various values between 0.0% and 100.0%, in addition to the approximate 50.0% and 25.0% values demonstrated in FIGS. 2A and 2C. The overlap percentage can change due to the pixel geometry parameter, the visual quality parameter, the algorithm being used, and other image quality and computing system factors.

Figure 3:
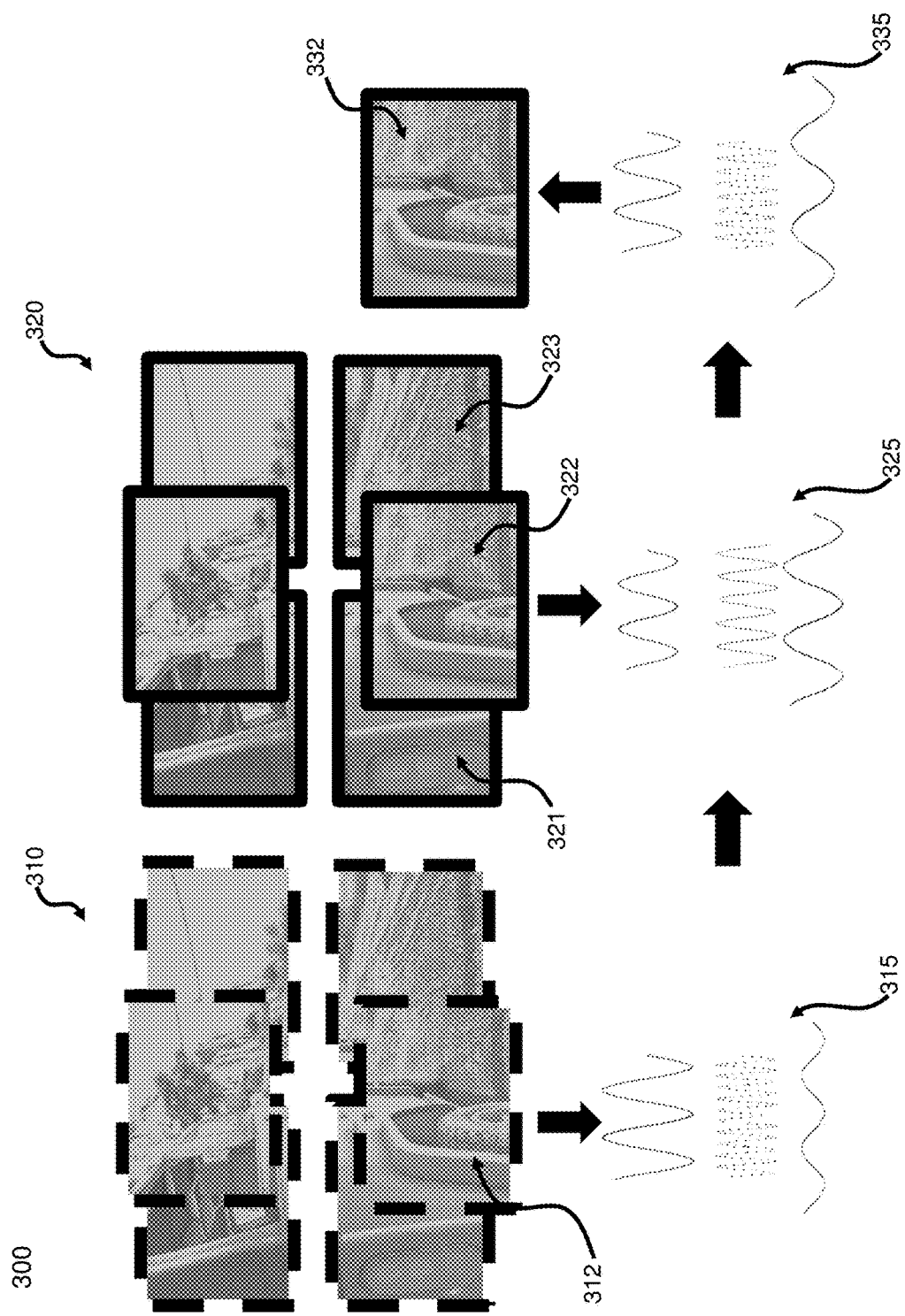
FIG. 3 is an illustration of a diagram of an example frequency spectrum recombination process flow.

FIG. 3 is an illustration of a diagram 300 of an example frequency spectrum recombination process flow. Diagram 300 is demonstrating that low-resolution image 310 is divided into tiles using a similar tile pattern as for the high-resolution image 320. Low-resolution tile 312 can be processed through a frequency spectrum algorithm, for example FFT, to produce the frequency spectrum data 315. Similarly, high-resolution image 320 has intermediate tiles 321, 322, 323 determined for the image. Then each intermediate tile is processed by a frequency spectrum algorithm. In this example, tile 322 is processed to generate frequency spectrum data 325.

Frequency spectrum data 315 and frequency spectrum data 325 are combined using an interpolation algorithm to produce frequency spectrum data 335. The frequency spectrum algorithm is applied in an inverse fashion to produce a high-resolution tile 332. High resolution final tile 332 contains the image data from intermediate tile 322 and also the image effects injected by low resolution image tile 312, such as blur, bloom, SSAO, SSR, and other image effect types. Final tile 332 can then be combined with the other generated final high-resolution tiles (not shown) to generate the final high-resolution image.

Figure 4A:
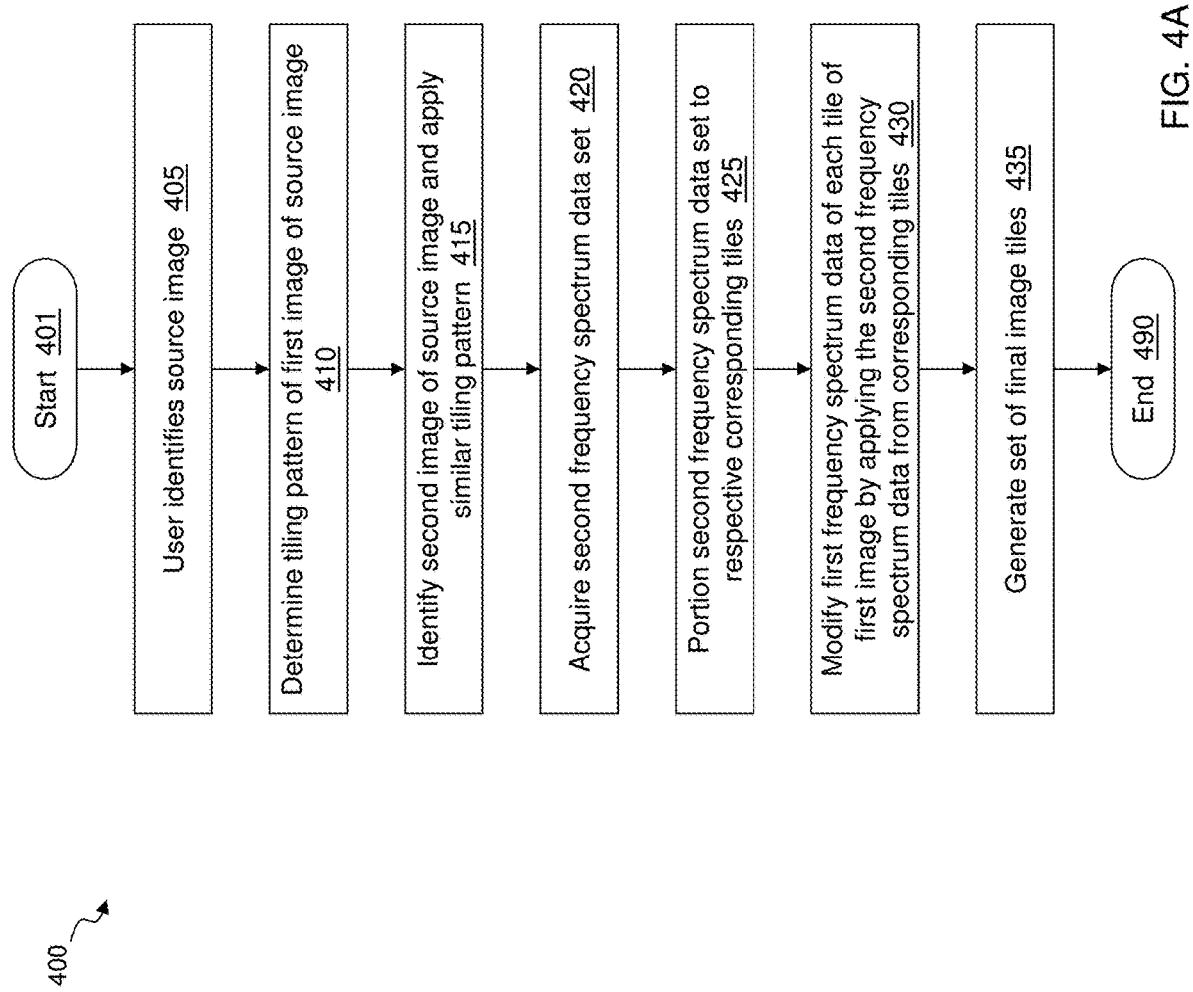
FIG. 4A is an illustration of a block diagram of an example method for creating a high-resolution image.

FIG. 4A is an illustration of a flow diagram of an example method 400 for generating a high-resolution image using frequency spectrum recombination. Method 400 begins at a step 401 and proceeds to a step 405. In step 405, a user identifies and selects an image that will become the source or original image. The user can also compose the image at this step, if the application so allows the user. Once the user composes the image, if available, and selects the generation operation, the method 400 proceeds to a step 410. The source image data can be stored in a frame buffer or in another storage location. In step 410, the process determines a tiling pattern for a first image of the source image. The process can utilize various factors and parameters to determine the tiling pattern, for example, the image pixel geometry parameter, the available system resources parameter, the user requested target resolution or final image resolution parameter, how the process' algorithm prefers the tiling pattern, and other factors and parameters.

In a step 415, the process identifies the low-resolution image as the second image derived from the source image data. The low-resolution image can be stored in the frame buffer or another location. Typically, the low-resolution image is the version that is displayed on the user's display equipment; hence its resolution is constrained by the display equipment being used. The low-resolution image can be an alternative resolution for the purposes of method 400. The process can determine the appropriate resolution to utilize for the low-resolution image. The low-resolution image can be divided into tiles using a similar tiling pattern as was used for the source image in step 410. In some aspects, the source image and the low-resolution image can be at the same resolution, for example, in scenarios where there is a single tile determined for the source image.

In a step 420, the frequency spectrum data set (the second frequency spectrum data set) for the low-resolution image is acquired. Various frequency spectrum algorithms can be used, such as a fast Fourier transformation. In a step 425, the second frequency spectrum data set can be portioned to each respective corresponding tile of the low-resolution image. This can help to maintain image characteristics from across the entire image within each corresponding tile.

Proceeding to a step 430, the first frequency spectrum data set from each of the intermediate tiles can be modified by applying, i.e., combining, such as with an interpolation algorithm, the second frequency spectrum data from each of the respective corresponding tiles. In a step 435, the recombined frequency spectrum data is processed, in the inverse, through a frequency spectrum algorithm, such as iFFT, to produce a final high-resolution tile, which contains the original high-resolution image portion and the low-resolution image effects appropriate for that final high-resolution tile. The method 400 ends at a step 490.

Figure 4B:
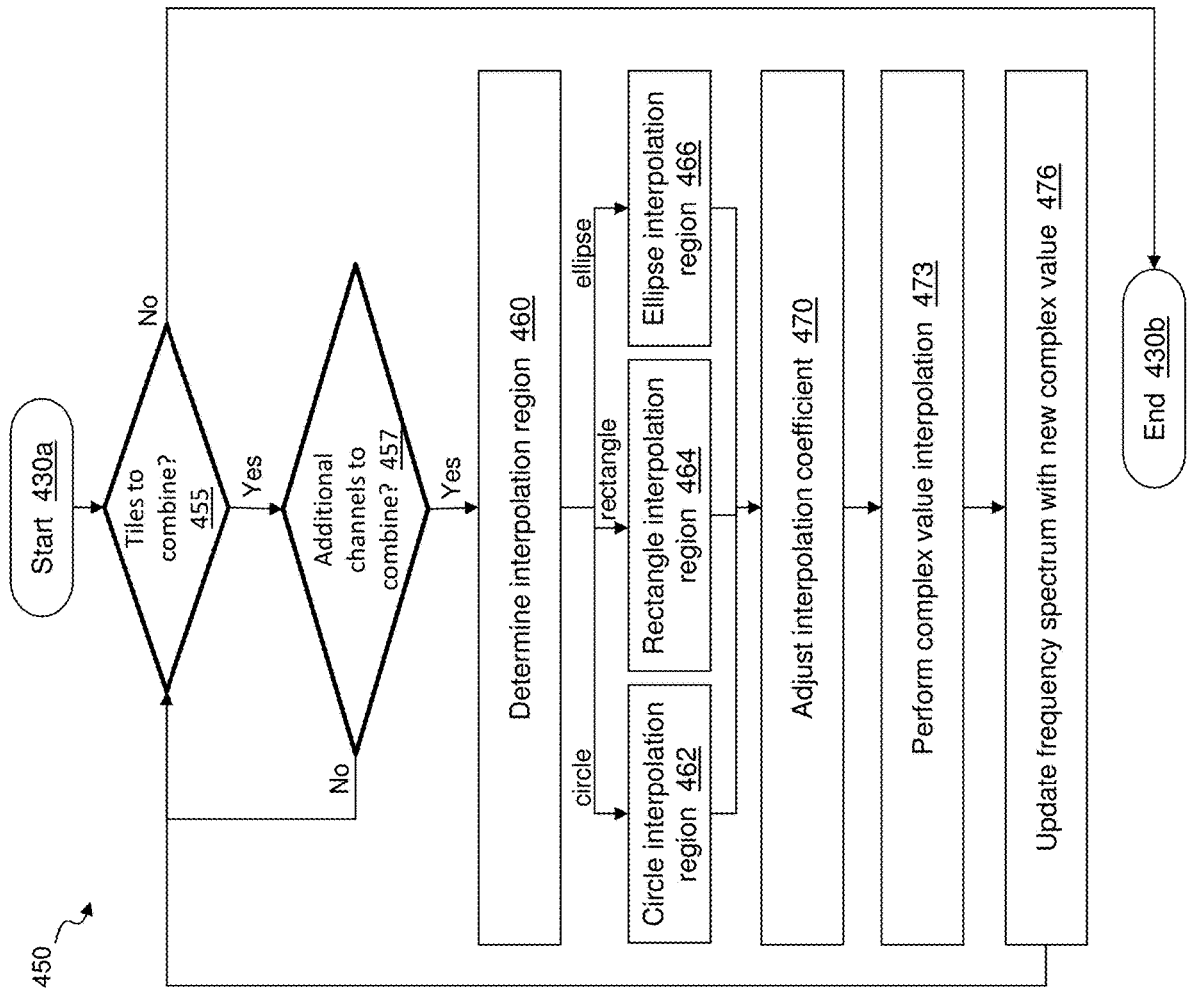
FIG. 4B is an illustration of a block diagram of an example method to combine two frequency spectrums.

FIG. 4B is an illustration of a flow diagram of an example method 450 to combine the frequency spectrum from an intermediate tile and a corresponding tile. The interpolation algorithm described herein is for demonstration purposes. Other interpolation algorithms can be used in the process. The method 450 is an expansion of the step 430 already presented. The method 450 begins at a step 430a, representing the start of step 430. Proceeding to a decision step 455, the method 450 determines if there are remaining frequency spectrum data sets, to be combined. If decision step 455 is 'Yes', then the method 450 selects two corresponding frequency spectrum data sets, one set generated from the intermediate tile and one set generated from the corresponding tile.

Proceeding to a decision step 457, the method 450 determines the number of channels contained within the frequency spectrum data. Typically, the channels correspond to the three channels of red-green-blue. In other aspects, the channels can include other channel colors in addition to the colors identified or replacing the colors identified, for example, grayscale can have one channel and cyan can be added to the red-green-blue channels to provide four channels. Each channel can be processed independently. Method 450 is demonstrating a serial approach to identifying each channel and combining the data, and in other aspects, a parallel approach can be implemented. If decision step 457 determines there is a channel that has uncombined frequency spectrum, the 'Yes' path is followed to a step 460.

In the step 460, the interpolation coefficient region is determined for each complex value of the frequency spectrum data, for each of the first and second frequency spectrum data sets. This step determines the effective region shape, if the frequency spectrum data were to be graphed. The region shape can be one of various shapes, where each shape can define a same or separate equation. In some aspects the process can use 3 defined shapes and in other aspects, the process can select from more shapes, such as 6 or 10. For this example, the region shape is demonstrated as a circle, rectangular, and ellipse shape.

The method 450 will determine a default shape if the analysis cannot determine a relative region shape. If the region is determined to be a circle shape, the method 450 proceeds to a step 462 and uses equation 1. If the region is determined to be a rectangular shape, the method 450 proceeds to a step 464 and uses equation 2. If the region is determined to be an ellipse shape, the method 450 proceeds to a step 466 and uses equation 3.

Equation 1: An example clamping equation for a circular region shape $$\text{clamp } (IC, 0.0, 1.0) = (1.0 - NDTC)/IF$$

Equation 2: An example clamping equation for a rectangular region shape $$\text{clamp } (IC, 0.0, 1.0) = \min((1.0\ NDTC\_width\_axis)/IF,$$

$$(1.0 - NDTC\_height\_axis)/IF$$

Equation 3: An example clamping equation for an elliptical region shape $$\text{clamp } (IC, 0.0, 1.0) = (1.0 - S\_NDTC)/IF$$

where IC is the calculated interpolation coefficient and is clamped between 0.0 and 1.0;

NDTC is the normalized distance to the center, i.e., distance to the half size of the tile;

S_NDTC is the normalized scaled distance to the center, i.e., distance to the half size of the tile and scaling is based on the ellipse stretch parameter;

IF is the interpolation factor; and min is a function that returns the minimum value of the parameters.

The IF can be a positive real number, i.e., greater than 0.0 to infinity. A general default value for IF can be 1.2, though the IF used can vary greatly, such as due to blending and other factors. The lower the IF, the more that the second (low-resolution) frequency spectrum data set will impact the first (high-resolution) frequency spectrum data set. The higher the IF, the less affect the second frequency spectrum data set has on the first frequency spectrum data set. For example, an IF of 0.0001 can result in an aggressive recombination of frequency spectrum, meaning the second frequency spectrum data can greatly affect the second frequency spectrum data. While a higher IF number, such as 100.0, can result in a significantly smaller affect or impact on the first frequency spectrum data. The IF can be modified by applying a blending intensity parameter, such as to provide gradual blending towards the edges of the second frequency spectrum (see FIG. 5, element 532) and to provide for a user-controlled blending intensity (see FIG. 5, element 527).

Proceeding to a step 470, the interpolation coefficient can be adjusted. The adjustment algorithm can use a cosine interpolation, Catmull-Rom interpolation, Bezier curves, and other higher order interpolation methods, as selected by the process. In this example, a cosine interpolation is utilized as shown in Equation 4. This can result in smoother transitions as compared to linear interpolation.

Equation 4: An example of a cosine interpolation adjustment $$A\_IC = 0.5*(1.0 - \cos(PI*IC))$$

where A_IC is the adjusted interpolation coefficient;
cos is the cosine function; and
PI is the math constant PI.

Proceeding to a step 473, complex value interpolation is performed between the complex numbers representing the high-resolution frequency spectrum set and the low-resolution frequency spectrum set, utilizing the A_IC that has been calculated. In a step 476, the new complex value determined in step 473 is inserted in place of the previous first frequency spectrum complex value. The method 450 proceeds back to decision step 455.

Returning to decision step 457, if the result is 'No', meaning that there are no more channels to combine, then the method 450 returns to decision step 455. If decision step 455 result is 'No', the method 450 proceeds to a step 430b, representing the end of step 430 and the method 450 ends.

Figure 5:
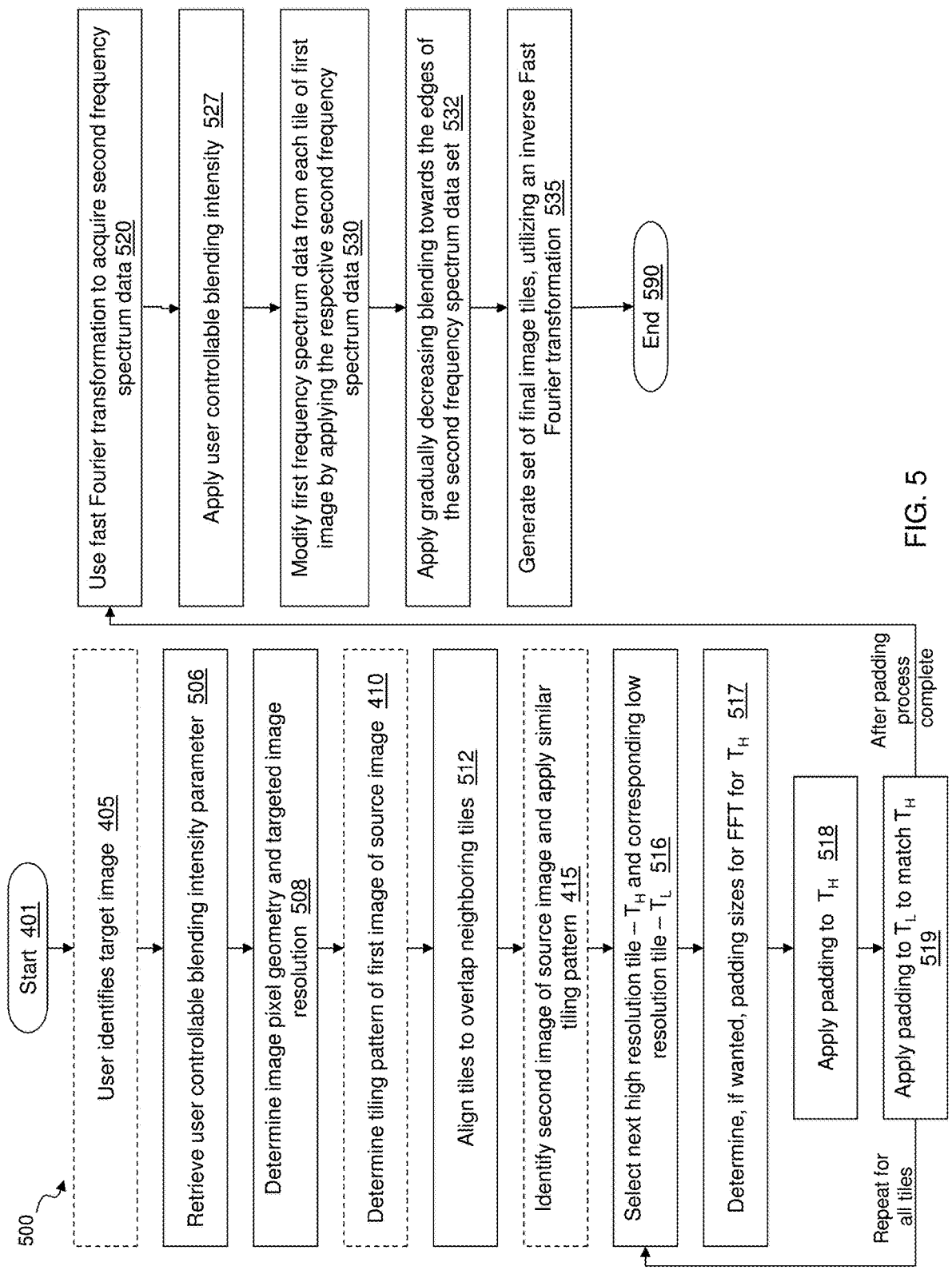
FIG. 5 is an illustration of a block diagram showing additional method steps building on FIG. 4A.

FIG. 5 is an illustration of a flow diagram showing additional method 500 steps added to FIGS. 4A and 4B's described methods. The method 500 is similar to method 400, therefore, only the unique method steps are presented below. In addition, the method 500 is demonstrating a serial progression of steps. In other aspects, the steps can be performed in series, in parallel, or a combination thereof. In alternative aspects, the steps can be arranged so that the processing for one set of intermediate and corresponding tiles can be completed, or partially completed, before processing another set of intermediate and corresponding tiles.

Step 405 can proceed to a step 506 where the process can retrieve a user controllable blending intensity parameter. Proceeding to a step 508, the process can analyze the source image and determine various factors and parameters. These factors and parameters can include the pixel geometry parameter, the visual quality parameter, the source or target image resolution, and other factors. These factors can be passed to step 410 to be utilized in the algorithm to determine the intermediate tile size and positioning.

Proceeding from step 410 to a step 512, the process can determine how to align the intermediate tiles for overlapping neighboring tiles. Various overlap percentages can be utilized, as well as determining how to position the intermediate tiles, such as on a corner or side of the neighboring tiles (see FIGS. 2A, 2B, and 2C). Overlap areas can be limited at the corners and edges of the image. The method 500 proceeds to the step 415.

From step 415, the method 500 proceeds to a step 516 where a set of intermediate and corresponding tiles are selected. Proceeding to a step 517, padding sizes for the intermediate tile is determined. Padding can assist specific frequency spectrum algorithms, such as FFT, for performance determinism. For example, certain algorithms are more efficient when an input size is a power of two, and some algorithms prefer the input size to be a multiple of certain prime numbers. In a step 518, the process fills out the intermediate tile with the padding value, for example, clamp-to-edge padding. In a step 519, the corresponding tile is similarly padded to match the intermediate tile. In an alternative aspect, the padding action of 519 can be bypassed and the differences between the intermediate tile and the corresponding tile can be accounted for during the method 450 interpolation calculation. This determination can be made, for example, if the frequency spectrum algorithm has an implementation, i.e., library implementation, option to accommodate the intermediate and corresponding tile differences.

This process repeats back to step 516 until all of the tiles are analyzed. After all of the tiles are analyzed, the method 500 proceeds to a step 520. Steps 516 to 519 can be bypassed if the method 500 determines that the frequency spectrum algorithm's worst-case performance metrics are acceptable. In the step 520, the second frequency spectrum data set can be acquired, such as a fast Fourier transformation. This data set is derived from the low-resolution image. This data set is portioned out to each respective corresponding tile.

Proceeding to a step 527, the process can utilize the previously retrieved user controllable blending intensity parameter and utilize the parameter in the algorithm when blending the frequency spectrum data as described in step 430 or in the next step 530. For example, the blending intensity parameter can range from 0.0% to 100.0%, while harsher, (higher) values can be utilized in some circumstances. If the blending intensity factor is set to 10.0%, then some frequency spectrum blending will occur even at the lowest combination settings.

In the step 530, the first frequency spectrum data set is derived from the intermediate tiles. The first frequency spectrum data set for each intermediate tile is modified by applying the second frequency spectrum data set from the respective corresponding tile. This can affectively apply image characteristics to a portion of the first image so that the resulting image carries both the high-resolution aspects and image characteristics. The applying can utilize a combination, algorithm, or other processes appropriate for frequency spectrum combinations.

Proceeding to a step 532, the process can apply various techniques to improve overall image fidelity and quality, for example, gradually decreasing blending of the frequency spectrum data as the process moves toward the edge of the corresponding tile frequency spectrum data. This can be an adjustment, i.e., change or modification, to the interpolation factor. In a step 435 the resulting combined frequency spectrum data can be inverse transformed, such as using iFFT, to generate final high-resolution tiles. The final high-resolution tiles can be transmitted, stored, or used to generate a final high-resolution image. Method 500 ends at a step 590.

Figure 6:
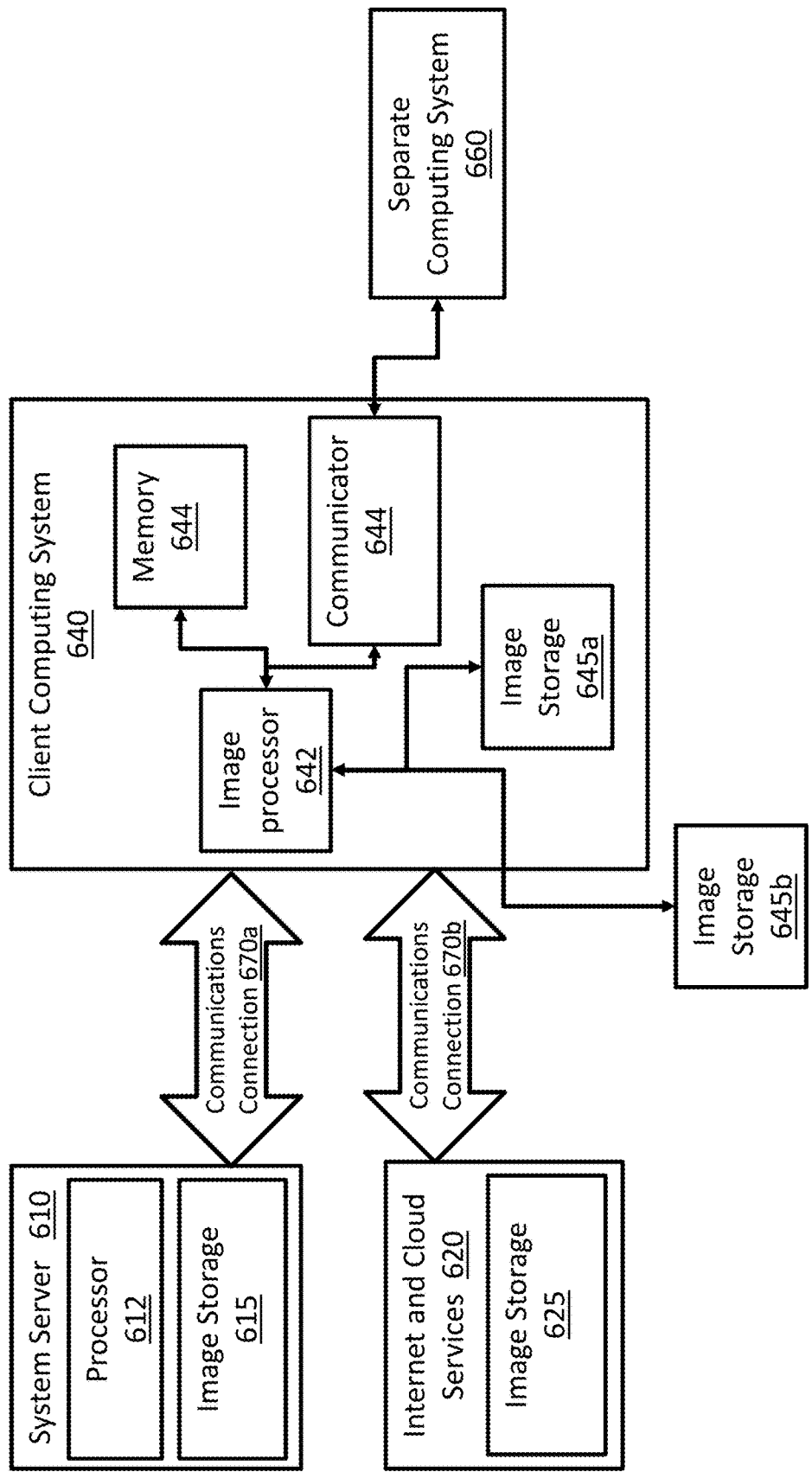
FIG. 6 is an illustration of a block diagram of a high-resolution image capture system.

FIG. 6 is an illustration of a block diagram of a high-resolution image generation system 600. The system 600 includes optional system server 610 and optional internet and cloud services 620. System server 610 and internet and cloud services 620, if present, can be communicatively coupled through 670a and 670b to client computing system 640. Communication connection 670a and 670b can be a conventional communicator and utilize various interfaces using combinations of communicators and protocols, such as internet network communicators, Ethernet, local area networks, WI-FI, and other types of communicators using various protocols.

System server 610 can include a processor 612 and image storage location 615. Processor 612 is a logical feature that represents that the system server 610 can execute one or more applications on behalf of the client computing system 640 and that processor 612 can also produce video and images that can be sent, in a rendered, partially rendered, or data state, to client computing system 600. Processor 612 can include a GPU or multiple GPUs. Image storage 615 can be used, if present, to store an image and image data being sent to the client computing system 640 and to store an image and image data received from the client computing system, such as a user account storage area. Internet and cloud services 620 can include an image and image data storage location 625 to allow a user to store and share an image. In an alternate aspect, the internet and cloud services 620 can include the functionality described by system server 610.

Client computing system 640 can include an image processor 642, a memory 644, a communicator 644, an image storage 645a and 645b. Image storage 645a and 645b can store an image and image data. These components are optional to the overall system 600. For example, image processing can occur at processor 612, image processor 642, or both. Image storage can be located within client computing system 640, such as represented by image storage 645a, for example, memory and a hard disk drive. Image storage can also be located external to the client computing system 640, as shown with image storage 645b, for example, an external hard disk drive, and server storage location 615.

Communicator 644 can send the final high-resolution image or the final high-resolution tiles to an external computing system 660, for example, another computer, laptop, mobile device, tablet, smartphone, or other computing system. Communicator 644 can also be used to send an image and image data to one or more social media, picture sharing, cloud storage areas, e-mail, text messaging, specialized applications, or other electronic channels, as shown through internet and cloud services 620.

Those skilled in the art to which this application relates will appreciate that other and further additions, deletions, substitutions and modifications can be made to the described aspects. It is also to be understood that the terminology used herein is for the purpose of describing particular aspects only, and is not intended to be limiting, since the scope of the present disclosure will be limited only by the claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

As will be appreciated by one of skill in the art, the disclosure or parts thereof may be embodied as a method, system, or computer program product. Accordingly, the features disclosed herein, or at least some of the features, may take the form of an entirely hardware embodiment, an entirely software embodiment (including firmware, resident software, micro-code, etc.) or an embodiment combining software and hardware aspects all generally referred to herein as a "circuit" or "module." Some of the disclosed features may be embodied in or performed by various processors, such as digital data processors or computers, wherein the computers are programmed or store executable programs of sequences of software instructions to perform one or more of the steps of the methods. Thus, features or at least some of the features disclosed herein may take the form of a computer program product on a non-transitory computer-usable storage medium having computer-usable program code embodied in the medium. The software instructions of such programs can represent algorithms and be encoded in machine-executable form on non-transitory digital data storage media.

Thus, portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include machine code, such as produced by a compiler, and files containing higher level code that may be executed by the computer using an interpreter.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A high-resolution image capture system, comprising:
an image storage device to store images, image data, and tiles of said images, wherein said images are one or more of a source image, a first image, a second image, and a final image, and wherein said tiles are one or more of intermediate tiles, corresponding tiles, and final tiles of said final image; and
an image processor to generate said first image and said second image from said source image and to generate final tiles of said final image by processing said first image and said second image, wherein said first image is a higher resolution than said second image, and said processing includes:
determining said intermediate tiles from said first image and said corresponding tiles from said second image;
determining frequency spectrum data sets for each of said intermediate tiles and said corresponding tiles;
interpolating said frequency spectrum data sets from each of said intermediate tiles and said respective corresponding tiles, wherein said interpolating includes determining an interpolation region shape for said frequency spectrum data sets and calculating an interpolation coefficient utilizing said interpolation region shape; and
converting said interpolated frequency spectrum data sets to said final tiles.

2. The system as recited in claim 1, wherein said interpolating further includes performing a complex value interpolation using said interpolation coefficient.

3. The system as recited in claim 1, wherein said determining said intermediate tiles utilizes a pixel geometry parameter and an available system resource parameter.

4. The system as recited in claim 1, wherein said determining said intermediate tiles determines one or more tile sizes.

5. The system as recited in claim 1, wherein said first image and said second images are processed utilizing a fast Fourier transformation (FFT) algorithm.

6. The system as recited in claim 1, wherein said image processor is further to retrieve a user requested high-resolution image parameter and a user-controlled blending intensity parameter.

7. The system as recited in claim 1, wherein said image processor includes one or more graphics processing units (GPUs).

8. The system as recited in claim 1, wherein said interpolating includes utilizing a gradual decrease in blending of frequency spectrum data towards an edge of said frequency spectrum data set of said corresponding tile.

9. The system as recited in claim 1, wherein said image storage device includes one or more of a memory, a hard disk drive or a server storage location.

10. A cloud-based image processing system, comprising:
an image storage to store image data, intermediate tiles of a first image, corresponding tiles of a second image, and final tiles of a final image; and
an image processor communicatively coupled to said image storage and to generate, said final tiles utilizing said image data, said first image, and said second image, wherein said first image and said second image are derived from said image data, and said first image is at a higher resolution than said second image, and wherein said utilizing includes:
determining said intermediate tiles from said first image and said corresponding tiles from said second image;
determining frequency spectrum data sets for each of said intermediate tiles and said corresponding tiles;
interpolating said frequency spectrum data sets from each of said intermediate tiles and said respective corresponding tiles, wherein said interpolating includes determining an interpolation region shape for said frequency spectrum data sets and calculating an interpolation coefficient utilizing said interpolation region shape; and
converting said interpolated frequency spectrum data sets to said final tiles.

11. The system as recited in claim 10, wherein said interpolating further includes performing a complex value interpolation using said interpolation coefficient.

12. The system as recited in claim 10, wherein said determining said intermediate tiles includes utilizing a pixel geometry parameter and an available system resource parameter.

13. The system as recited in claim 10, wherein said determining said intermediate tiles includes determining one or more tile sizes.

14. The system as recited in claim 10, wherein said first image and said second images are utilized using a fast Fourier transformation (FFT) algorithm.

15. The system as recited in claim 10, wherein said image processor is further to retrieve, a user requested high-resolution image parameter and a user-controlled blending intensity parameter.

16. The system as recited in claim 10, wherein said image processor includes one or more graphics processing units (GPUs).

17. The system as recited in claim 10, wherein said interpolating includes utilizing a gradual decrease in blending of frequency spectrum data towards an edge of said frequency spectrum data set of said corresponding tile.

18. The system as recited in claim 10, wherein said image storage device includes one or more of a memory, a hard disk drive or a server storage location.

* * * * *